United States Patent [19]

Fu et al.

[11] Patent Number: 4,657,688

[45] Date of Patent: Apr. 14, 1987

[54] NEUTRAL HYDROCARBOXYCARBONYL THIONOCARBAMATE SULFIDE COLLECTORS

[75] Inventors: Yun-Lung Fu, Milford; Samuel S. Wang, Cheshire, both of Conn.

[73] Assignee: American Cyanamid Company, Stamford, Conn.

[21] Appl. No.: 806,585

[22] Filed: Dec. 9, 1985

Related U.S. Application Data

[62] Division of Ser. No. 641,657, Aug. 17, 1984, Pat. No. 4,584,097.

[51] Int. Cl.[4] ............................................. C09K 3/00

[52] U.S. Cl. ..................................... 252/61; 558/234

[58] Field of Search ......................... 252/61; 558/234

[56] References Cited

U.S. PATENT DOCUMENTS

| | | | |
|---|---|---|---|
| 2,691,635 | 10/1954 | Harris et al. | 558/234 |
| 3,590,998 | 7/1971 | Collins et al. | 558/234 |
| 3,907,854 | 9/1975 | Bolth et al. | 252/61 |
| 4,556,483 | 12/1985 | Fu et al. | 252/61 |
| 4,584,097 | 4/1986 | Fu et al. | 252/61 |

FOREIGN PATENT DOCUMENTS

| | | | |
|---|---|---|---|
| 14126 | 4/1972 | Japan . | |
| 62254 | 4/1982 | Japan | 558/234 |

OTHER PUBLICATIONS

Oyamada et al., "Reaction of Alkyl Alkoxycarbonylthiocarbamates with Ammonia," Nippon Nogei Kagaku Kaishi 1976, 50(1), 23–7, (Japanese), (CA 85:5171w).

*Primary Examiner*—Robert A. Wax

*Attorney, Agent, or Firm*—Frank M. Van Riet

[57] ABSTRACT

New and improved collector compositions for use in froth flotation processes for the beneficiation of mineral values from base metal sulfide ores are disclosed. The collector compositions comprise at least one hydrocarboxycarbonyl thionocarbamate compound selected from compounds of the formula:

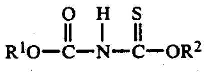

wherein $R^1$ and $R^2$ are each, independently, selected from saturated and unsaturated hydrocarbyl radicals, alkyl polyether radicals and aromatic radicals, or such radicals optionally substituted by polar groups selected from halogen, nitrile and nitro groups. The use of the hydrocarboxycarbonyl thionocarbamate collectors provides excellent metallurgical recoveries of sulfide mineral values in froth flotation processes conducted over a broad range of pH conditions including acid, neutral and mildly alkaline pH.

14 Claims, No Drawings

NEUTRAL HYDROCARBOXYCARBONYL THIONOCARBAMATE SULFIDE COLLECTORS

CROSS-REFERENCE TO RELATED APPLICATION

This is a division of application, Ser. No. 641,657, filed Aug. 17, 1984, now U.S. Pat. No. 4,584,097 of D. R. Nagaraj entitled PROCESS FOR THE FLOTATION OF COPPER SULFIDE MINERALS IN ACID, NEUTRAL OR MILDLY ALKALINE CIRCUITS.

BACKGROUND OF THE INVENTION

The present invention relates to froth flotation processes for recovery of metal values from base metal sulfide ores. More particularly, it relates to new and improved sulfide collectors comprising certain hydrocarboxycarbonyl thionocarbamate compounds which exhibit excellent metallurgical performance over a broad range of pH values.

Froth flotation is one of the most widely used processes for beneficiating ores containing valuable minerals. It is especially used for separating finely ground valuable minerals from their associated gangue or for separating valuable minerals from one another. The process is based on the affinity of suitably prepared mineral surfaces for air bubbles. In froth flotation, a froth or a foam is formed by introducing air into an agitated pulp of the finely ground ore in water containing a frothing or foaming agent. A chief advantage of separation by froth flotation is that it is a relatively efficient operation at a substantially lower cost than many other processes.

Current theory and practice state that the success of a sulfide flotation process depends to a great degree on the reagent(s) called collector(s) that impart(s) selective hydrophobicity to the value sulfide mineral that has to be separated from other minerals. Thus, the flotation separation of one mineral species from another depends upon the relative wettability of mineral surfaces by water. Typically, the surface free energy is purportedly lowered by the adsorption of heteropolar collectors. The hydrophobic coating thus provided acts in this explanation as a bridge so that the mineral particles may be attached to an air bubble. The practice of this invention is not, however, limited by this or other theories of flotation.

In addition to the collector, several other reagents are also necessary. Among these, the frothing agents are used to provide a stable flotation froth, persistent enough to facilitate the mineral separation, but not so persistent that it cannot be broken down to allow subsequent processing. The most commonly used frothing agents are pine oil, creosote and cresylic acid and alcohols such as 4-methyl-2-pentanol, polypropylene glycols and ethers, etc.

Moreover, certain other important reagents, such as the modifiers, are also largely responsible for the success of flotation separation of sulfide minerals. Modifiers include all reagents whose principal function is neither collecting nor frothing, but one of modifying the surface of a mineral so that a collector either adsorbs to it or does not. Modifying agents can thus be considered as depressants, activators, pH regulators, dispersants, deactivators, etc. Often, a modifier may perform several functions simultaneously. Current theory and practice of sulfide flotation again state that the effectiveness of all classes of flotation agents depends to a large extent on the degree of alkalinity or acidity of the ore pulp. As a result, modifiers that regulate the pH are of great importance. The most commonly used pH regulators are lime, soda ash and, to a lesser extent, caustic soda. In sulfide flotation, however, lime is by far the most extensively used. In copper sulfide flotation, which dominates the sulfide flotation industry, for example, lime is used to maintain pH values over 10.5 and more usually above 11.0 and often as high as 12 or 12.5. In prior art sulfide flotation processes, preadjustment of the pH of the pulp slurry to 11.0 and above is necessary, not only to depress the notorious gangue sulfide minerals of iron, such as pyrite and pyrrhotite, but also to improve the performance of a majority of the conventional sulfide collectors, such as xanthates, dithiophosphates, trithiocarbonates and thionocarbamates. The costs associated with adding lime are becoming quite high and plant operators are interested in flotation processes which require little or no lime addition, i.e., flotation processes which are effectively conducted at slightly alkaline, neutral or even at acid pH values. Neutral and acid circuit flotation processes are particularly desired because pulp slurries may be easily acidified by the addition of sulfuric acid, and sulfuric acid is obtained in many plants as a by-product of the smelters. Therefore, flotation processes which do not require preadjustment of pH or which provide for pH preadjustment to neutral or acid pH values using less expensive sulfuric acid are preferable to current flotation processes because current processes require pH preadjustment to highly alkaline values of at least about 11.0 using lime which is more costly.

To better illustrate the current problems, in 1980, the amount of lime used by the U.S. copper and molybdenum mining industry was close to 550 million pounds. For this industry lime accounted for almost 92.5% by weight of the total quantity of reagents used, and the dollar value of the lime used was about 51.4% of the total reagent costs for the industry, which amounted to over 28 million dollars.

As has been mentioned above, lime consumption in individual plants may vary anywhere from about one lb. of lime/metric ton of ore processed up to as high as 20 lbs. of lime/metric ton of ore. In certain geographical locations, such as South America, lime is a scarce commodity and the costs of transporting and/or importing lime have risen considerably in recent years. Still another problem with prior art highly alkaline processes is that the addition of large quantities of lime to achieve sufficiently high pH causes scale formation on plant and flotation equipment, thereby necessitating frequent and costly plant shutdowns for cleaning.

It is apparent, therefore, that there is a strong desire to reduce or eliminate the need for adding lime to sulfide flotation processes to provide substantial savings in reagents costs. In addition, reducing or eliminating lime in sulfide ore processing may provide other advantages by facilitating the operation and practice of unit operations other than flotation, such as slurry handling.

In the past, xanthates and dithiophosphates have been employed as sulfide collectors in froth flotation of base metal sulfide ores. A major problem with these conventional sulfide collectors is that at pH's below 11.0, poor rejection of pyrite or pyrrhotite is obtained. In addition, with decreasing pH the collecting power of these sulfide collectors also decreases, rendering them unsuitable for flotation in mildly alkaline, neutral or acid environments. This decrease in collecting power with decreasing pH, e.g., below about 11.0, requires that the collector dosage be increased many fold, rendering it generally economically unattractive. There are many factors which may account for the lowering of collector activity with decreasing pH. A collector may interact differently with different sulfide minerals at a given pH. On the other hand, poor solution stability at low pH, such as that exhibited by xanthates and trithiocarbonates may very well explain the observed weak collector behavior.

Efforts to overcome the above deficiencies led to the development of neutral derivatives of xanthates such as alkyl xanthogen alkyl formates generally illustrated by the formula:

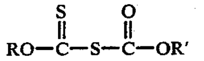

The alkyl xanthogen alkyl formates are disclosed as sulfide collectors in U.S. Pat. No. 2,412,500. Other structural modifications of the general structure were disclosed later. In U.S. Pat. No. 2,608,572 for example, the alkyl formate substituents contain unsaturated groups. In U.S. Pat. No. 2,608,573, the alkyl formate substituents described contain halogen, nitrile and nitro groups. Bis alkyl xanthogen formates are described as sulfide collectors in U.S. Pat. No. 2,602,814. These modified structures have not found as much commercial application as the unaltered structures. For example, an alkyl xanthogen alkyl formate is currently commercially available under the trade name MINEREC®A from the Minerec Corporation. MINEREC®A, an ethyl xanthogen ethyl formate, as well as its higher homologs, still leave a lot to be desired at pH below 11.0 in terms of collecting power and pyrite rejection, as is more particularly described hereinafter.

Another class of sulfide collectors which have obtained some degree of commercial success in froth flotation are oily sulfide collectors comprising dialkylthionocarbamate or diurethane compounds having the general formula:

Several disadvantages are associated with the preparation and use of these compounds. In U.S. Pat. No. 2,691,635, a process for making dialkylthionocarbamates is disclosed. The three steps of the reaction sequence described are cumbersome and the final by-product is methyl mercaptan, an air pollutant which is costly to treat. In U.S. Pat. No. 3,907,854 an improved process for making dialkylthionocarbamate is described. Although good yields and high purity are claimed as the novel features of the process, it is noteworthy that a side product of the reaction is sodium hydrosulfide, also a pollutant which requires special treatment for disposal. In U.S. Pat. No. 3,590,998 a thionocarbamate sulfide collector structure in which the N-alkyl substituent is joined by alkoxycarbonyl groups is disclosed. The preparation process described therein requires the use of expensive amino acid esters for the displacement reaction of the thio esters of xanthates. The by-products of this process are either methyl mercaptan or sodium thioglycolate. In addition, this type of structurally modified thionocarbamate has enjoyed very little commercial success. As will become apparent from the disclosure of this invention below, dialkylthionocarbamates are weak collectors as the pH drops below certain values.

Accordingly, it is an object of the present invention to provide a new and improved sulfide collector and flotation process for the beneficiation of sulfide minerals employing froth flotation methods which does not require any pre-adjustment of pH to highly alkaline values.

It is another object of the present invention to provide a new and improved sulfide collector and froth flotation process for the beneficiation of sulfide minerals which provides selective recovery of sulfide metal values with selective rejection of pyrite, pyrrhotite and other gangue sulfides.

It is a further object of the present invention to provide a new and improved sulfide collector and flotation process for the beneficiation of sulfide minerals using froth flotation methods which employs a novel class of sulfide collector reagents which may be prepared and used without the formation of harmful by-products or environmental pollutants.

It is another object of the present invention to provide a flotation process for the beneficiation of sulfide ores at pH values of 10.0 or below using certain novel collectors containing novel donor atom combinations designed specifically for low pH flotation.

It is still another object of the present invention to provide a new and improved process for selective flotation of value sulfides in acid circuits, wherein inexpensive sulfuric acid is used to control the pH.

SUMMARY OF THE INVENTION

In accordance with these and other objects, the present invention, in one embodiment, provides a new and improved collector composition for beneficiating an ore containing sulfide minerals with selective rejection of pyrite, pyrrhotite and other gangue sulfides, said collector composition comprising at least one hydrocarboxycarbonyl thionocarbamate compound selected from compounds having the formula:

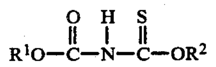

wherein $R^1$ and $R^2$ are each independently selected from saturated and unsaturated hydrocarbyl radicals, alkyl polyether radicals and aromatic radicals and such radicals optionally, and independently substituted with polar groups selected from halogen, nitrile and nitro groups. Particularly preferred hydrocarboxycarbonyl thionocarbamate sulfide collectors in accordance with the present invention comprise compounds of the formula wherein $R_1$ is $C_1$–$C_6$ alkyl or aryl and $R_2$ is $C_1$–$C_8$ alkyl.

Generally, and without limitation, the new and improved hydrocarboxycarbonyl thionocarbamate collectors of this invention may be used in amounts of from about 0.005 to 0.5 pounds per ton of ore, and preferably from about 0.01 to 0.1 pounds per ton of ore, to effectively selectively recover metal and mineral values from base metal sulfide ores while selectively rejecting pyrite and other gangue sulfides. The new and improved sulfide collectors of this invention may generally be employed independently of the pH of the pulp slurries. Again, without limitation, these collectors may be employed at pH values of from about 3.5 to 11.0, and preferably from about 4.0 to 10.0.

In accordance with another embodiment, the present invention provides a new and improved process for beneficiating an ore containing sulfide minerals with selective rejection of pyrite and pyrrhotite, said process comprising: grinding said ore to provide particles of flotation size, slurrying said particles in an aqueous medium, conditioning said slurry with effective amounts of a frothing agent and a metal collector, and frothing the desired sulfide minerals preferentially over gangue sulfide minerals by froth flotation procedures; said metal collector comprising at least one hydrocarboxycarbonyl thionocarbamate compound selected from compounds having the formula given above.

In particularly preferred embodiments, a new and improved method for enhancing the recovery of copper sulfide minerals from an ore containing a variety of sulfide minerals is provided wherein the flotation process is performed at a controlled pH of less than or equal to 10.0, and the collector is added to the flotation cell.

The present invention therefore provides a new class of sulfide collectors and a new and improved process for froth flotation of base metal sulfide ores. The hydrocarboxycarbonyl thionocarbamate collectors and the process of the present invention unexpectedly provide superior metallurgical recovery in froth flotation separations as compared with conventional sulfide collectors, even at reduced collector dosages, and are effective under conditions of acid, neutral or mildly alkaline pH. In accordance with the present invention, a sulfide ore froth flotation process is provided which simultaneously provides for superior beneficiation of sulfide mineral values with considerable savings in lime consumption.

Other objects and advantages of the present invention will become apparent from the following detailed description and illustrative working examples.

DETAILED DESCRIPTION OF THE INVENTION

In accordance with the present invention, sulfide metal and mineral values are recovered by froth flotation methods in the presence of a novel sulfide collector, said collector comprising at least one hydrocarboxycarbonyl thionocarbamate compound of the formula:

$$R^1O-\overset{O}{\overset{\|}{C}}-\overset{H}{\overset{|}{N}}-\overset{S}{\overset{\|}{C}}-OR^2$$

wherein $R^1$ and $R^2$ are, independently, selected from saturated and unsaturated hydrocarbyl radicals, alkyl polyether radicals and aromatic radicals, said $R^1$ and $R^2$ radicals, optionally and independently being substituted by polar groups selected from halogen, nitrile and nitro groups. By hydrocarbyl is meant a radical comprised of hydrogen and carbon atoms which includes straight or branched, saturated or unsaturated, cyclic or acyclic hydrocarbon radicals. The $R^1$ and $R^2$ radicals may be unsubstituted or optionally substituted by polar groups such as halogen, nitrile or nitro groups. In addition, $R^1$ and $R^2$ may independently be selected from alkyl polyether radicals of the formula:

$$R^3(OY)_n-$$

wherein $R^3$ is $C_1$ to $C_6$ alkyl; Y is an ethylene or propylene group and n is an integer of from 1 to 4 inclusive. $R^1$ and $R^2$ may also independently be selected from aromatic radicals such as benzyl, phenyl, cresyl and xylenyl radicals, and aralkyl or alkaryl radicals, or any of these aromatic radicals optionally substituted by the above-mentioned polar groups.

In preferred embodiments, the hydrocarboxycarbonyl thionocarbamate collectors of the above formula employed are those compounds wherein $R^1$ is selected from $C_1$ to $C_6$ alkyl, or aryl, and especially preferably are ethyl, isopropyl, or phenyl radicals; and $R^2$ is selected from $C_1$–$C_8$ alkyl radicals, for example, methyl, ethyl, n-propyl, isopropyl, n-butyl, sec-butyl, isobutyl, n-amyl, isoamyl, n-hexyl, isohexyl, heptyl, n-octyl and 2-ethylhexyl.

Illustrative compounds within the above formula for use as sulfide collectors in accordance with the present invention include:

N-ethoxycarbonyl-O-methyl thionocarbamate,
N-ethoxycarbonyl-O-ethyl thionocarbamate,
N-ethoxycarbonyl-O-(n-propyl) thionocarbamate,
N-ethoxycarbonyl-O-isobutyl thionocarbamate,
N-ethyoxycarbonyl-O-(n-pentyl) thionocarbamate,
N-ethoxycarbonyl-O-(2-methylpentyl) thionocarbamate,
N-ethoxycarbonyl-O-allyl thionocarbamate,
N-ethoxycarbonyl-O-(2-methoxylethyl) thionocarbamate,
N-ethoxycarbonyl-O-(2-ethoxyethyl) thionocarbamate,
N-ethoxycarbonyl-O-(2-butoxyethyl) thionocarbamate,
N-propoxycarbonyl-O-propyl thionocarbamate,
N-phenoxycarbonyl-O-ethyl thionocarbamate; and
N-phenoxycarbonyl-O-isopropyl thionocarbamate, to name but a few.

The hydrocarboxycarbonyl thionocarbamate compounds of the present invention may be conveniently prepared, without forming polluting by-products, first, by reacting a corresponding chloroformate compound with ammonium, sodium or potassium thiocyanate to form an isothiocyanate intermediate, in accordance with equation (1) as follows:

$$R^1O-\overset{O}{\overset{\|}{C}}-Cl + XSCN \longrightarrow R^1-O-\overset{O}{\overset{\|}{C}}-NCS + XCl \quad (1)$$

wherein $R^1$ is the same as defined above and X is $NH_4^+$, $Na^+$, or $K^+$.

Thereafter, the hydrocarboxycarbonyl isothiocyanate intermediate is reacted with an active hydroxyl compound in accordance with equation (2) as follows:

$$R^1-O-\overset{O}{\overset{\|}{C}}-NCS + R^2OH \longrightarrow R^1O-\overset{O}{\overset{\|}{C}}-\overset{H}{\overset{|}{N}}-\overset{S}{\overset{\|}{C}}-OR^2 \quad (2)$$

By active hydroxyl compound is meant any compound bearing an hydroxyl group which will readily react with the isothiocyanate to form the corresponding thionocarbamate. Illustrative active hydroxyl compounds include aliphatic alcohols, cyclic and acyclic, saturated and unsaturated, unsubstituted or substituted by polar groups such as halogen, e.g., chloro, bromo or iodo, nitrile and nitro groups; aryl alkanols such as benzyl alcohols; ethoxylated and/or propoxylated alcohols and phenols.

The corresponding chloroformates for reaction with the ammonium, sodium or potassium thiocyanate in accordance with equation (1) above, may themselves be prepared by reaction of the corresponding aliphatic or aromatic alcohols with phosgene, in accordance with equation (3) as follows:

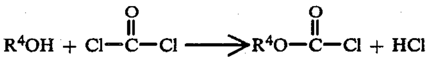

(3)

wherein $R^4$ comprises any of the active hydroxyl compounds defined above. By way of further illustration, chloroformates made from ethoxylated or propoxylated alcohols may be prepared in accordance with this method, e.g.,

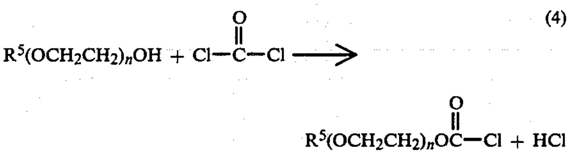

(4)

wherein $R^5$ is $C_1$–$C_6$ alkyl and n is 1 to 4 inclusive; as well as, aromatic alcohols such as phenols, cresols and xylenols, e.g.,

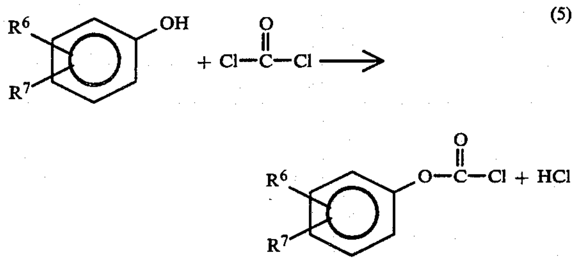

(5)

wherein $R^6$=H or $CH_3$ and $R^7$=H, $CH_3$, Cl, Br, I, $-NO_2$ or $-C{\equiv}N$.

Referring again to the preparation of the new and improved hydrocarboxycarbonyl thionocarbamate sulfide collectors of the present invention shown in Equations (1) and (2) above, it is apparent that sodium chloride is the only innocuous side product in the reaction of equation (1). Moreover, in equation (2), the condensation of the isothiocyanate with the active hydroxyl compound is fast and complete and does not release any polluting by-product.

In accordance with the present invention, the above-described hydrocarboxycarbonyl thionocarbamates are employed as sulfide collectors in a new and improved froth flotation process which provides a method for enhanced beneficiation of sulfide mineral values from base metal sulfide ores over a wide range of pH values and more particularly under acidic, neutral, slightly alkaline and highly alkaline conditions.

In accordance with the present invention, the new and improved, essentially pH-independent, process for the beneficiation of mineral values from base metal sulfide ores comprises, firstly, the step of size-reducing the ore to provide ore particles of flotation size. As is apparent to those skilled in this art, the particle size to which an ore must be size reduced in order to liberate mineral values from associated gangue or non-values, i.e., liberation size, will vary from ore to ore and may depend on several factors, such as, for example, the geometry of the mineral deposits within the ore, e.g., striations, agglomeration, comatrices, etc. In any event, as is common in this art, a determination that particles have been size reduced to liberation size may be made by microscopic examination. Generally, and without limitation, suitable particle size will vary from between about 50 mesh to about 400 mesh sizes. Preferably, the ore will be size-reduced to provide flotation sized particles of between about +65 mesh and about −200 mesh. Especially preferably for use in the present method are base metal sulfide ores which have been size-reduced to provide from about 14% to about 30% by weight of particles of +100 mesh and from about 45% to about 75% by weight of particles of −200 mesh sizes.

Size-reduction of the ores may be performed in accordance with any method known to those skilled in this art. For example, the ore can be crushed to −10 mesh size followed by wet grinding in a steel ball mill to specified mesh size or pebble milling may be used. The procedure employed in size-reducing the ore is not critical to the method of this invention, as long as particles of effective flotation size are provided.

Preadjustment of pH is conveniently performed by addition of the modifier to the grind during the size reduction step.

The pH of the pulp slurry may be pre-adjusted to any desired value by the addition of either acid or base, and typically sulfuric acid or lime are used for this purpose, respectively. A distinct advantage of the present process is that the new and improved hydrocarboxycarbonyl thionocarbamate sulfide collectors employed in the process of this invention do not require any pre-adjustment of pH and generally the flotation may be performed at the natural pH of the ore pulp, thereby simplifying the process, saving costs and reducing lime consumption and related plant shut-downs. Thus, for example, good beneficiation has been obtained in accordance with the process of the present invention at pH values ranging between 3.5 and 11.0, and especially good beneficiation has been observed with pH values within the range of from about 4.0 to about 10.0 pH.

The size-reduced ore, e.g., comprising particles of liberation size, is thereafter slurried in aqueous medium to provide a flotable pulp. The aqueous slurry or pulp of flotation sized ore particles, typically in a flotation apparatus, is adjusted to provide a pulp slurry which contains from about 10 to 60% by weight of pulp solids, preferably 25 to 50% by weight and especially preferably from about 30% to about 40% by weight of pulp solids.

In accordance with a preferred embodiment of the process of the present invention, the flotation of copper, zinc and lead sulfides is performed at a pH of less than or equal to 10.0 and preferably less than 10.0. It has been discovered that in conducting the flotation at this pH, the new and improved hydrocarboxycarbonyl thionocarbamate collectors of the present invention exhibit exceptionally good collector strength, together with excellent collector selectivity, even at reduced collector dosages. Accordingly, in this preferred process, sulfuric acid is used to bring the pH of the pulp slurry to less than or equal to 10.0, if necessary.

In any event and for whatever reason, the pH of the pulp slurry may be pre-adjusted if desired at this time by any method known to those skilled in the art.

After the pulp slurry has been prepared, the slurry is conditioned by adding effective amounts of a frothing agent and a collector comprising at least one hydrocarboxycarbonyl thionocarbamate compound as described above. By "effective amount" is meant any amount of the respective components which provides a desired level of beneficiation of the desired metal values.

More particularly, any known frothing agent may be employed in the process of the present invention. By way of illustration such floating agents as straight or branched chain low molecular weight hydrocarbon alcohols, such as $C_6$ to $C_8$ alkanols, 2-ethyl hexanol and 4-methyl-2-pentanol, also known as methyl isobutyl carbinol (MIBC) may be employed, as well as, pine oils, cresylic acid, polyglycol or monoethers of polyglycols and alcohol ethoxylates, to name but a few of the frothing agents which may be used as frothing agent(s) herein. Generally, and without limitation, the frothing agent(s) will be added in conventional amounts and amounts of from about 0.01 to about 0.2 pounds of frothing agent per ton of ore treated are suitable.

The new and improved hydrocarboxycarbonyl thionocarbamate sulfide collectors for use in the process of the present invention may generally be added in amounts of from about 0.005 to about 0.5 pounds of collector per ton of ore and preferably will be added in amounts of from about 0.01 lbs. to about 0.3 lbs/ton of ore processed. In flotations wherein it is desired to selectively collect copper sulfide minerals and selectively reject iron sulfide minerals such as pyrite and pyrrhotite, as well as other gangue sulfides, the collectors will generally be added in amounts of from about 0.01 lbs/ton to about 0.1 lbs/ton of ore. In bulk sulfide flotations, higher levels of collector will be used, as will be more particularly described below.

Thereafter, in accordance with the process of the present invention, the conditioned slurry, containing an effective amount of frothing agent and an effective amount of collector comprising at least one hydrocarboxycarbonyl thionocarbamate compound, is subjected to a frothing step in accordance with conventional froth flotation methods to float the desired sulfide mineral values in the froth concentrate and selectively reject or depress pyrite and other gangue sulfides.

It has also been surprisingly discovered that, contrary to the conventional belief that a neutral, oily collector is most effective when it is added to the grind instead of to the flotation cell, the new and improved hydrocarboxycarbonyl thionocarbamate collectors of the present invention exhibit more efficient recovery when they are added to the flotation cell, as opposed to the grind. The novel collectors of this invention, although water-insoluble for all practical purposes, have the distinct advantage of being easily dispersible. The novel collectors when added to the flotation cell provide higher copper recovery in the first flotation stage together with improved copper recovery overall, indicating improved kinetics of flotation, to be more fully described hereinafter. Of course, the new and improved collectors may also be added to the grind in accordance with conventional methods, and improved value minerals recovery are still obtained.

Heretofore, the new and improved hydrocarboxycarbonyl thionocarbamate collectors and processes incorporating them of the present invention have been described for use in those applications wherein it is desired to selectively concentrate or collect certain metal value sulfides, mainly those of copper, lead and zinc from other gangue sulfides, e.g., pyrite and pyrrhotite, and other gangue materials, e.g., silicates, carbonates, etc. In certain cases, however, it may be desirable to collect all of the sulfides in an ore including sphalerite (ZnS) and the iron sulfides, i.e., pyrite and pyrrhotite, in addition to the copper sulfide materials.

More particularly, there exist certain massive or complex sulfide ores which contain large amounts of iron sulfide minerals, such as pyrite and pyrrhotite. With these complex sulfide ores, flotation of the iron sulfide minerals is frequently desired to obtain the sulfur-values from these minerals, which after further processing can be made to yield sulfur and sulfur reagents. Under these circumstances, a bulk sulfide flotation is desired, i.e., a flotation wherein all of the sulfide minerals are floated and collected. Bulk sulfide flotations are also desired in order to beneficiate precious metals from precious metal-bearing pyrite and pyrrhotite minerals.

Often, however, these massive or complex sulfide ores not only contain several value metals as sulfides, such as copper, zinc, lead, nickel, cobalt, etc., but also contain, in close association therewith, gangue materials such as carbonates as well as silicas and siliceous materials.

These massive or complex sulfide ores are not uncommon and present a unique set of problems for froth flotation beneficiation. Bulk sulfide flotation for these ores cannot be successfully conducted conventional flotation conditions, e.g., at pH values of $>10.0$, because pyrite and pyrrhotite values are depressed at high pH values. At pH values of 3.0 to 5.0, bulk sulfide flotation is high using conventional collectors, such as xanthates, but sulfuric acid is used as the modifier to reduce the pulp pH to these values. The carbonate gangue minerals present in these complex ores are acid-soluble and consequently large amounts of sulfuric acid are required, e.g. after 10–12 lbs/ton or ore, which is economically unattractive, and the use of sulfuric acid with ores containing alkaline earth metal carbonates such as calcite, dolomite, etc. results in the formation of large amounts of insoluble, alkaline earth metal sulfates, which causes very severe scaling on plant equipment, again necessitating frequent and costly plant shutdowns. At a pulp pH in the range of about 6.0 to 9.0, bulk sulfide flotation with conventional collectors such as xanthates is less than optimum.

It has been unexpectedly discovered that the new and improved hydrocarboxycarbonyl thionocarbamate collectors of this invention, under carefully specified conditions, provide optimum flotation of bulk sulfides from sulfide containing ores. In accordance with this aspect of the present invention, optimum bulk sulfide flotations are obtained by peforming froth flotation under neutral or slightly alkaline pH values, and more particularly at a pH of 6.0 to 9.0, inclusive, and employing a larger amount of the hydrocarboxycarbonyl thionocarbamate collectors of this invention, namely at dosage levels of from about 0.1 to about 1.0 lbs/ton or, expressed differently, at levels of equal to or above about 0.05 moles/metric ton of ore.

After the bulk sulfide concentrate is prepared by flotation under these pH conditions and at the collector dosages specified, the value sulfides of copper, lead and zinc are separated from the large amount of iron sulfides present in the bulk concentrate, by a second stage flotation at a higher pH, i.e. values above 9.0, whereby the value sulfides are collected and the iron sulfides are selectively depressed. In the past, xanthate collectors were employed in the bulk flotation at pH values of 3.0 to 5.0, and the second stage flotation wherein the iron sulfides are selectively depressed had to be run at a pH of about 11.0, because pyrite rejection for the xanthate collectors is poor below pH 11.0. As can be appreciated, considerable quantities of lime had to be added to modify the pH for this second stage flotation. Now, in accordance with this aspect of the present invention, using the hydrocarboxycarbonyl thionocarbamate collectors, bulk sulfide flotation is obtained at a higher pH of 6.0 to 9.0, and the lime consumption needed in the second stage of flotation, i.e., the separation of value metal sulfides from iron sulfides, is reduced. Moreover, the hydrocarboxycarbonyl thionocarbamate collectors of this invention are much stronger collectors for copper, lead and zinc in the pH range of 9.0 to 11.0, such that the second stage flotation may be carried out at pH values just sufficient to depress the iron sulfides, in which case there is no need to raise the pH beyond 11.0, thereby providing further savings in lime consumption.

Other objects and advantages provided by the new and improved collectors and process of this invention will become apparent from the following working Examples, which are provided by way of further illustration only to enable those skilled in this art to better understand and practice the present invention.

PREPARATION 1

Synthesis of Ethoxycarbonyl Isothiocyanate

A 2-liter three-necked round-bottomed flask fitted with a reflux condenser protected from the moisture by a drying tube containing anhydrous calcium sulfate, an addition funnel and a mechanical stirrer was mounted in a heating mantle. In the flask were placed 700 ml of dry acetonitrile and 194 grams of potassium thiocyanate. The mixture was heated, with stirring, to 70° C. and then the external heating was discontinued. To the mixture were added with stirring, 217 grams of ethyl chloroformate from the addition funnel in 40 minutes. An exothermic reaction set in. The mixture thickened and turned yellow. After the addition was completed, the temperature of the reaction mixture reached 77° C. The reaction mixture was stirred for 3 hours without any external heating. Thereafter, the reaction mixture was cooled to room temperature and the precipitate was removed by filtration. The precipitate cake was washed with dry acetonitrile. The filtrate and the washing were combined and concentrated by evaporation under reduced pressure. The residual liquid was distilled through a fractioning column. There were obtained 86.9 grams of ethoxycarbonyl isothiocyanate, a colorless liquid which boiled at 45° C./11 mm Hg or 48° C./12 mm Hg.

PREPARATION 2

Synthesis of N-Ethoxycarbonyl-O-Isopropyl Thionocarbamate

Forty ml of isopropyl alcohol were added to 10 grams of the ethoxycarbonyl isothiocyanate (PREPARATION 1) and the reaction solution was mixed well by stirring. After the exotherm was over, the reaction solution was let stand overnight and the progress of the reaction was monitored by the infrared spectrum of the reaction solution. Completion of the reaction was indicated by the disappearance of the absorption band at 1960–1990 $cm^{-1}$ for the N=C=S group. The excess of isopropyl alcohol was removed by stripping under reduced pressure to give an oil residue. Crystallization from petroleum ether (b.p. 35°–60° C.) yielded 13.1 grams of colorless crystals of N-ethoxycarbonyl O-iospropyl thiocarbamate, melting at 32°–33° C.

PREPARATION 3

Synthesis of N-Ethoxycarbonyl-O-Isobutyl Thionocarbamate

Forty ml of isobutyl alcohol were added to 10 grams of ethoxycarbonyl isothiocyanate of PREPARATION 1. After the reaction was complete, the excess isobutyl alcohol was removed by stripping under reduced pressure. There was obtained 15 grams of N-ethoxycarbonyl-O-isobutyl thionocarbamate which was a colorless oil.

PREPARATION 4

Synthesis of N-Phenoxycarbonyl-O-Ethyl Thionocarbamate

Summary of Reaction Sequence

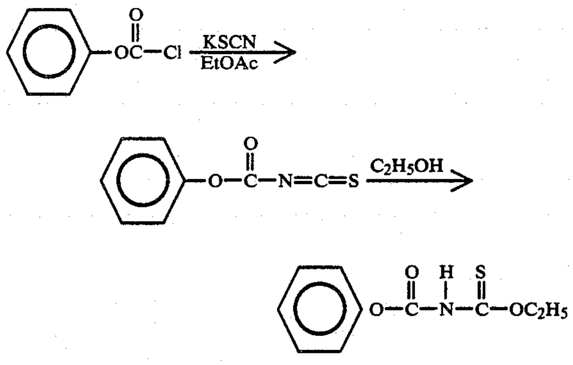

A 250 ml round-bottomed three-necked flask was equipped with a reflux condenser, a thermometer, an addition funnel and a mechanical stirrer. To the reaction flask were added 100 ml of ethyl acetate and 9.7 grams of potassium thiocyanate. The mixture was stirred and heated. To the mixture were added, dropwise from the addition funnel, 15.7 grams of phenyl chloroformate in 30 minutes. After the exotherm was over, the reaction mixture was let stir for 1½ hours. (GC indicated that phenyl chloroformate was reacted completely. ) Ten ml of absolute ethyl alcohol were added. The reaction mixture was stirred and the progress of the reaction was monitored by IR until phenoxycarbonyl isothiocyanate had been consumed complete. Fifty ml of water were added to dissolve the solids. The reaction mixture was transferred to a 250 ml separatory funnel. The organic layer was collected. It was dried over $MgSO_4$ and filtered. The filtrate was concentrated by stripping off the volatiles. A solid weighing 20.4 grams was obtained. The solid was recrystallized from hexanes. The pure product melts at 81°–83° C.

The above synthesized hydrocarboxycarbonyl thionocarbamates were employed as collectors for a variety of sulfide ores and tested for beneficiation properties at a variety pH values and compared with prior art sulfide collector compounds. The other homologous and/or analogous hydrocarboxycarbonyl thionocarbamates employed in the following examples may be prepared according to substantially identical preparation methods, substituting the appropriate corresponding active hydroxyl compounds to provide the $R^2$ group shown.

In each of the following Examples, the following general preparation and testing procedures were used:

The sulfide ores were crushed to −10 mesh sizes. An amount of the crushed ores of between about 500 to 2,000 grams was wet ground in a steel ball mill with a steel ball charge of 5.3 to 10.7 kg and at 50 to 75% solids for about 6 to 14 minutes or until a pulp having this size distribution indicated was obtained, generally about 10-20% +65 mesh, 14-30% +100 mesh and 40-80% −200 mesh. Lime and sulfuric acid were used as the pH modifiers to adjust the pH as required. These modifiers were generally added to the grind. The frother used was added to the grind in some tests and added to the flotation cell in others. In certain tests, 50% the collector was added to the grind, otherwise, the collector was added to the first and second stages of conditioning in the flotation cell.

The size reduced pulp, with or without frother and collector additives, was transferred to a Denver D12 rectangular flotation cell. The volume of the pulp was adjusted to 1200-2650 ml by adding water to provide a pulp density of about 20-45% solids and a pulp level in the cell at about 2 cm below the lip.

Collector and/or frother were added to the pulp while agitating at about 1100-1400 rpm. The pulp was conditioned for a period of two minutes and pH and temperature measurements were taken at that time. At the end of the two minutes conditioning, air was fed at about 5-7 liters/minute from a compressed air cylinder. The froth flotation was continued for about 3 minutes during which a first stage concentrate was collected. Thereafter the air was turned off and more collector and frother were added and the pulp was conditioned for an additional two minutes. After the second two minute conditioning step the air was turned on and a second stage concentrate was collected. The flotation times were predetermined to give a barren froth upon completion of flotation.

The first and second stage concentrates and tailings were filtered, dried, sampled and assayed for copper, iron and sulfur. Tap water at the required temperature was used in all tests. The abbreviation t is used to indicate a standard ton, e.g., 2000 lbs. and T represents a metric ton, e.g., 1000 kg. or 2204 lbs.

EXAMPLE 1

Natural pH Flotation

A U.S. southwestern copper ore with a copper head assay of 0.3% and 1.7% pyrite ($FeS_2$) head assay was used in this series of tests. In this and all of the following examples, the gangue iron minerals such as pyrite, pyrrhotite, etc., are for the sake of convenience, simply referred to as pyrite. The principal copper minerals were chalcocite and chalcopyrite.

460 grams of the ore were ground for 8.5 minutes at 60% solids to obtain a pulp slurry with a size distribution of 17.5% +65 mesh, 35.2% +100 mesh and 41% −200 mesh. The natural pH of the pulp, i.e. without external addition of either lime or sulfuric acid pH modifiers, was found to be 5.5. The pulp was conditioned at 30% solids with the collector indicated and a frothing agent comprising 50/50 w/w MIBC/pine oil added at 0.08 lbs/ton of ore and first and second stage flotations conducted in accordance with the procedures outlined above. The collectors employed and the results of the concentrate and tailings assays are set forth in TABLE 1, as follows:

TABLE 1

Natural pH 5.5; Frother - 1:1 MIBC/pine oil 0.08 lbs/t
Head Assay: Cu—0.3% $FeS_2$—1.7%

| Example | Collector | Dosage | % Cu Rec. | % Cu Grade | % $FeS_2$ Rec. |
|---|---|---|---|---|---|
| A. | Sodium Ethyl Xanthate | 0.054 | 18.6 | 0.7 | 2.1 |
| B | Sodium Ethyl Xanthate | 0.200 | 82.8 | 4.0 | 89.7 |
| C. | Sodium Diethyl Dithiophosphate | 0.100 | 66.6 | 3.3 | 64.4 |
| D. | Sodium diisobutyl dithiophosphinate | 0.054 | 69.3 | 2.3 | 11.2 |
| E. | Ethyl Xanthogen Ethyl formate | | | | |
| | Batch 1 | 0.054 | 84.1 | 2.3 | 74.2 |
| | Batch 4 | 0.054 | 79.2 | 1.9 | 51.2 |
| | Batch 5 | 0.054 | 86.4 | 3.9 | 91.1 |
| F. | O—isopropyl-N—-ethyl thionocarbamate | 0.054 | 73.2 | 2.7 | 57.1 |
| G. | O—isobutyl-N—ethyl thionocarbamate | 0.054 | 78.0 | 3.2 | 51.1 |
| 1. | N—ethoxycarbonyl-O—isopropyl thionocarbamate | 0.054 | 90.8 | 9.6 | 67.3 |

°MINEREC ® A, Minerec Corporation, Baltimore, Md. U.S.A.

It is apparent that the conventional collectors shown in Examples A-G were much weaker than Example 1 of the present invention at this pH. The hydrocarboxycarbonyl thionocarbamate of Example 1 provided not only the maximum copper recovery for the collectors tested, but also maximum copper grade at an acceptable pyrite rejection.

EXAMPLES 2-3

For the following Examples a U.S. Southwestern copper-molybdenum ore was used which had a head assay of 0.458% copper and 2.2% pyrite. The ore contained chalcopyrite, chalcocite and covellite as the major copper minerals. The ore was steel ball milled at 63% solids to provide a pulp with a size distribution of about 16.4% +65 mesh, 30% +100 mesh and 43.8% −200 mesh. The natural pH of the ground ore pulp was 5.0. The frother used was 1:1 MIBC/pine oil added at 50 gms/metric ton (T). To make the comparisons more rigorous and meaningful, the collectors were dosed on a equimolar basis, 0.03 moles/T are approximately 0.01 lbs/ton. In addition a selectivity/performance index was calculated for each of the collectors tested.

More particularly, the selectivity/performance index was defined and calculated in accordance with the equation:

$$I_{cu} = \frac{(100 - \%\ \text{Pyrite recovered})}{(100 - \%\ \text{Copper recovered})^2}$$

The selectivity index for copper is a convenient method for measuring not only the copper recovery of a collector but also its selectivity for rejecting pyrite. For example, with this particular ore, if a 90% recovery for copper and a 50% recovery of pyrite can be accepted as optimum, then the optimum selectivity index for copper would be $$I_{cu} = \frac{(100 - 50)}{(100 - 90)^2} = 0.5,$$

The collectors tested and the results obtained are set forth in Table 2 as follows:

TABLE 2

Natural pH 5.0 (no lime); Frother - 1:1 MIBC/pine oil at 50 g/T; Collectors at 0.03 Mole/Ton (approx. 0.01 lb./t)

| Example | Collector | % Cu Rec. | % Cu Grade | % $FeS_2$ Rec. | $I_{cu}$ |
|---|---|---|---|---|---|
| H | Sodium isobutyl xanthate | 33.2 | 4.3 | 9.6 | 0.02 |
| I | O—isobutyl N—ethyl thionocarbamate | 76.8 | 8.2 | 46.6 | 0.100 |
| J | O—isopropyl N—methyl thionocarbamate | 67.7 | 5.8 | 38.8 | 0.059 |
| K | Ethyl Xanthogen Ethyl Formate, Batch 1 | 84.6 | 9.2 | 50.0 | 0.211 |
| | Ethyl Xanthogen Ethyl* Formate, Batch 1 | 88.2 | 7.1 | 55.5 | 0.319 |
| | Ethyl Xanthogen Ethyl Formate, Batch 2 | 86.2 | 6.3 | 52.7 | 0.248 |
| | Ethyl Xanthogen Ethyl Formate, Batch 3, pure | 85.7 | 6.4 | 56.9 | 0.212 |
| L | Sodium n-butyl trithiocarbonate | 58.8 | 6.4 | 16.9 | 0.049 |
| M | Isobutyl xanthogen ethyl formate | 85.6 | 7.7 | 38.2 | 0.297 |
| N | Isopropyl xanthogen ethyl formate | 86.2 | 6.5 | 65.5 | 0.180 |
| O | Isopropyl xanthogen butyl formate | 88.7 | 6.1 | 64.6 | 0.277 |
| P | Ethyl xanthogen phenyl formate | 83.3 | 8.4 | 45.4 | 0.196 |
| 2 | N—Ethoxy carbonyl-O—isopropyl thionocarbamate | 90.8 | 9.6 | 67.3 | 0.389 |
| 3 | N—Ethoxy carbonyl-O—amyl thionocarbamate | 91.1 | 6.7 | 58.3 | 0.525 |

*This singular run gave unusually high copper recovery, and results were not reproducible. All other data represent averages of at least 3 independent trials which gave reproducible results.

The results of Table 2 clearly show the superiority of the collectors of this invention, Examples 2–3, over the conventional collectors of Examples H–P. Examples 2 and 3 showed high copper recovery coupled with satisfactory pyrite rejection. Only the collectors of Examples 2 and 3 provided $I_{cu}$'s close the the optimum 0.5 number.

EXAMPLES 4–7

In the following Examples, tests were conducted employing the same ore as in Examples 2–3 with various collectors to determine if the superiority of the collectors of this invention was exhibited even at higher dosage levels and was not restricted to just one dosage. The collectors tested, the dosages and the results obtained are set forth in Table 3 as follows:

TABLE 3

| Example | Collector | Mole/T Dosage | % Cu. Rec. | % Cu Grade | % $FeS_2$ Rec. | $I_{cu}$ |
|---|---|---|---|---|---|---|
| Q | Ethyl Xanthogen Ethyl Formate | | | | | |
| | (Batch 1) | 0.04 | 86.0 | 8.8 | 55.6 | 0.227 |
| | (Batch 3), pure | 0.04 | 88.6 | 6.0 | 65.7 | 0.261 |
| 4 | N—Ethoxycarbonyl-O—isopropyl Thionocarbamate | 0.04 | 91.2 | 7.1 | 78.5 | .277 |
| 5 | N—Ethoxycarbonyl-O—Butyl Thionocarbamate | 0.04 | 89.5 | 6.6 | 63.9 | 0.330 |
| R | Sodium ethyl Xanthate | 0.14 | 41.3 | 5.0 | 38.3 | 0.018 |
| S | Sodium diisobutyl dithiophosphinate | 0.14 | 59.0 | 7.7 | 24.0 | 0.045 |
| T | Ethyl xanthogen Ethyl formate (Batch 1) | 0.14 | 86.0 | 8.1 | 91.5 | 0.043 |
| U | Sodium butyl trithiocarbonate | 0.14 | 83.8 | 6.6 | 43.5 | 0.216 |
| V | Diallyl trithiocarbonate | 0.14 | 79.4 | 9.2 | 50.1 | 0.117 |
| W | Amyl allyl xanthate ester | 0.14 | 75.4 | 9.8 | 40.4 | 0.099 |
| 6 | N—Ethoxycarbonyl-O—isopropylthionocarbamate | 0.03 | 90.8 | 9.6 | 67.3 | 0.389 |
| 7 | N—ethoxycarbonyl-O—isopropylthionocarbamate | 0.014 | 89.4 | 8.4 | 48.6 | 0.456 |

As demonstrated by the data of Table 3, the new and improved collectors of Examples 4 and 5 each exhibited better copper recovery and $I_{cu}$ value at a 0.04 mole/T dosage than the conventional collectors of Example Q. Moreover, conventional collectors R–W were inferior to Examples 4, 5, 6 and 7 even at dosages of 0.14 mole/T. These data show that at pH 5.0 the novel collectors of this invention outperform the conventional collectors even at sharply reduced dosage levels, e.g., one-fifth as much in Example 6 and one-tenth as much in Example 7.

EXAMPLES 8–14

Using the same ore, the performance of conventional collectors and the collectors of this invention were compared with respect to hydrocarbon chain length and structural effects on performance against known dialkyl xanthogen formates. The collectors tested and the results obtained are set forth in Table 4 as follows:

TABLE 4

Natural pH 5.0 (no lime); Frother - 1:1 MIBC/pine oil at 50 g/T; Collectors at 0.03 Mole/T (approx. 0.01 lb./t)

| Example | Collector | % Cu Rec. | % Cu Grade | % $FeS_2$ Rec. | $I_{cu}$ |
|---|---|---|---|---|---|
| | Alkyl Xanthogen Alkyl (Phenyl) Formate | | | | |
| | 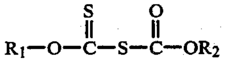 | | | | |
| | $R_1 = C_2H_5$, $R_2 = C_2H_5$, | | | | |
| | Batch 1 | 84.6 | 9.2 | 50.0 | 0.211 |
| | Batch 2 | 86.2 | 6.3 | 52.7 | 0.248 |
| | Batch 3 | 85.7 | 6.4 | 56.9 | 0.212 |
| Y | $R_1 = i\text{-}C_3H_7$, $R_2 = C_2H_5$ | 86.2 | 6.5 | 65.5 | 0.180 |
| Z | $R_1 = i\text{-}C_4H_9$, $R_2 = C_2H_5$ | 85.6 | 7.7 | 38.2 | 0.297 |
| AA | $R_1 = i\text{-}C_3H_7$, $R_2 = n\text{-}C_4H_9$ | 88.7 | 6.1 | 64.6 | 0.277 |
| BB | $R_1 = i\text{-}C_3H_7$, $R_2 = C_6H_5$ | 89.7 | 6.7 | 71.1 | 0.273 |
| CC | $R_1 = C_2H_5$, $R_2 = C_6H_5$ | 83.3 | 8.4 | 45.4 | 0.196 |
| | Ethoxy (Phenoxy) Carbonyl Alkyl Thionocarbamates | | | | |
| | 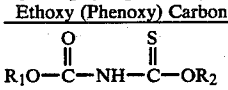 | | | | |
| 8 | $R_1 = C_2H_5$, $R_2 = C_2H_5$ | 83.2 | 10.1 | 38.2 | 0.219 |
| 9 | $R_1 = C_2H_5$, $R_2 = i\text{-}C_3H_7$ | 90.8 | 9.6 | 67.3 | 0.389 |
| 10 | $R_1 = C_2H_5$, $R_2 = i\text{-}C_4H_9$ | 90.6 | 7.7 | 81.3 | 0.212 |
| 11 | $R_1 = C_2H_5$, $R_2 = n\text{-}C_4H_9$ | 88.2 | 10.2 | 49.6 | 0.359 |
| 12 | $R_1 = C_2H_5$, $R_2 = C_5H_{11}$ | 91.1 | 6.7 | 58.3 | 0.525 |

TABLE 4-continued

| Example | Collector | % Cu Rec. | % Cu Grade | % $FeS_2$ Rec. | $I_{cu}$ |
|---|---|---|---|---|---|
| Natural pH 5.0 (no lime); Frother - 1:1 MIBC/pine oil at 50 g/T; Collectors at 0.03 Mole/T (approx. 0.01 lb./t) | | | | | |
| 13 | $R_1 = C_6H_5$, $R_2 = C_2H_5$ | 90.1 | 6.8 | 71.9 | 0.284 |
| 14 | $R_1 = C_6H_5$, $R_2 = i\text{-}C_3H_7$ | 90.9 | 6.5 | 68.1 | 0.384 |

The results shown in Table 4 demonstrate that, except for the diethyl homolog, all of the collectors of the present invention, e.g. Examples 8–14, showed better copper recovery than the corresponding conventional collectors substituted by the same $R_1$ and $R_2$ groups. The $I_{cu}$ values were also correspondingly better. The amyl homolog of Example 12 exhibited the best copper recovery and the best $I_{cu}$ value.

EXAMPLES 15–17

In the following Examples a South American copper-molybdenum ore was used. This ore contained 1.65% copper, 2.5% pyrite and 0.025% molybdenum. The copper was present as chalcocite, chalcopyrite, covellite, bornite, as well as some oxide copper minerals such as malachite and cuprite. Although the ore contained a large amount of chalcopyrite, an appreciable amount of it was rimmed with chalcocite and covellite.

About 500 grams of the −10 mesh ore was wet ground for 13 minutes in a steel ball mill with a steel ball charge of 5.3 kg and at 63% solids to yield a pulp with a size distribution of 14% +100 mesh and 62% −200 mesh. 10.5 g/T of diesel oil were also added in all tests.

The natural pH of the ore pulp was 5.5. The standard collector used for this ore is a mixture of a neutral alkyl xanthogen alkyl formate, e.g. ethyl xanthogen ethyl formate (MINEREC A), gasoline and 4-methyl-2-pentanol (MIBC) at a 60:30:10 ratio, respectively. The frother used is a polypropylene glycol monoalkylether, such as polypropylene glycol monomethyl ether, added at 60 g/T. The standard collector in blended and unblended form was compared with the collectors of this invention at various dosage levels and the collectors were added to the flotation cell in the first and second stages, in accordance with the flotation testing procedure outlined above. The test results are set forth in Table 5, as follows:

TABLE 5

| # | Collector | Dosage g/T | % Cu Rec. | % Cu Grade | % $FeS_2$ Rec. | $I_{cu}$ |
|---|---|---|---|---|---|---|
| Natural pH 5.5 (no lime, no $H_2SO_4$); Frother - 60 g/T; | | | | | | |
| DD | 60/30/10 blend of ethyl xanthogen ethyl formate/gasoline/MIBC | 20 | 66.1 | 6.7 | 69.5 | 0.026 |
| EE | 60/30/10 blend of ethyl xanthogen ethyl formate/gasoline/MIBC | 40 | 70.9 | 6.6 | 72.0 | 0.033 |
| FF | 60/30/10 blend of ethyl xanthogen ethyl formate/gasoline/MIBC | 58 | 72.9 | 6.2 | 76.8 | 0.032 |
| 15 | N—Ethoxycarbonyl-O—isopropyl thionocarbamate | 20 | 73.8 | 9.4 | 77.2 | 0.033 |
| 16 | N—Ethoxycarbonyl-O—isopropyl thionocarbamate | 40 | 76.4 | 8.3 | 80.8 | 0.034 |
| 17 | N—Ethoxycarbonyl-O—isopropyl thionocarbamate | 58 | 79.5 | 7.5 | — | — |
| GG | Ethyl xanthogen ethyl formate (Batch 1) | 20 | 67.4 | 6.9 | 75.5 | 0.023 |
| HH | Ethyl xanthogen ethyl formate (Batch 1) | 40 | 72.3 | 6.7 | 75.8 | 0.032 |
| II | Ethyl xanthogen ethyl formate (Batch 1) | 58 | 68.4 | 7.2 | 70.5 | 0.030 |

As demonstrated by the data of Table 5, the hydrocarboxycarbonyl thionocarbamate collectors of this invention shown in unblended form in Examples 15–17, were superior both in terms of percent copper recovered and grade as compared to the conventional neutral xanthogen formate collectors used either in pure or in blended form.

EXAMPLES 18–25

In the following Examples, the collectors of this invention in blended and unblended form were compared with the neutral xanthogen formate collectors on the same South American copper-molybdenum ore using the same testing procedures, however, this time the pH of the pulp slurry was adjusted to 4.0 by the addition of 5.0 Kg/T of sulfuric acid prior to conditioning and flotation testing. Again, the collectors were added to the flotation cell only, during the first and second conditioning steps. The collectors used and the results obtained are set forth in Table 6, as follows:

TABLE 6

| # | Collector | Dosage g/T | % Cu Rec. | % Cu Grade | % $FeS_2$ Rec. | $I_{cu}$ |
|---|---|---|---|---|---|---|
| Cu = 1.65%, $FeS_2$ = 2.5%, Sulfuric Acid 5.0 kg/T to pH 4.0 Frother Dow 1012 = 60 g/T | | | | | | |
| JJ | Standard blend 60/30/10 Ethyl xanthogen ethyl formate/gasoline/MIBC | 5 | 33.4 | 3.4 | 15.8 | 0.019 |
| KK | Standard blend 60/30/10 Ethyl xanthogen ethyl formate/gasoline/MIBC | 10 | 46.7 | 4.5 | 21.1 | 0.028 |
| LL | Standard blend 60/30/10 Ethyl xanthogen ethyl formate/gasoline/MIBC | 20 | 80.4 | 6.7 | 79.4 | 0.054 |
| MM | Standard blend 60/30/10 Ethyl xanthogen ethyl formate/gasoline/MIBC | 30 | 89.6 | 7.2 | 91.5 | 0.078 |
| NN | Standard blend 60/30/10 Ethyl xanthogen ethyl formate/gasoline/MIBC | 40 | 90.1 | 7.2 | 92.2 | 0.080 |
| OO | Pure ethyl xanthogen ethyl formate (Batch 3) | 5 | 61.7 | 6.6 | 44.5 | 0.038 |
| PP | Pure ethyl xanthogen ethyl formate (Batch 3) | 15 | 88.5 | 8.8 | 88.2 | 0.090 |
| QQ | Pure ethyl xanthogen ethyl formate (Batch 3) | 20 | 90.6 | 8.4 | 93.4 | 0.075 |
| 18 | Ethoxy carbonyl isopropyl thionocarbamate | 5 | 68.7 | 6.6 | 52.3 | 0.049 |
| 19 | Ethoxy carbonyl isopropyl thionocarbamate | 10 | 89.7 | 7.9 | 92.1 | 0.074 |
| 20 | Ethoxy carbonyl isopropyl thionocarbamate | 20 | 93.2 | 7.4 | 91.7 | 0.180 |
| 21 | 60/30/10 blend of N—ethoxycarbonyl-O—isopropyl thionocarbamate/gasoline/MIBC | 20 | 92.4 | 7.9 | 90.5 | 0.163 |
| 22 | 36/54/10 blend of N—ethoxycarbonyl-O—isopropyl thionocar- | 20 | 91.6 | 9.1 | 90.3 | 0.136 |

TABLE 6-continued

| Cu = 1.65%, FeS2 = 2.5%, Sulfuric Acid 5.0 kg/T to pH 4.0 Frother Dow 1012 = 60 g/T | | | | | | |
|---|---|---|---|---|---|---|
| # | Collector | Dosage g/T | % Cu Rec. | % Cu Grade | % $FeS_2$ Rec. | $I_{cu}$ |
| | bamate/gasoline/MIBC | | | | | |
| 23 | N—Ethoxycarbonyl-O—isobutyl thionocarbamate | 5 | 67.5 | 7.2 | 45.0 | 0.052 |
| 24 | N—Ethoxycarbonyl-O—isobutyl thionocarbamate | 10 | 89.8 | 9.0 | 87.7 | 0.119 |
| 25 | N—Ethoxycarbonyl-O—isobutyl thionocarbamate | 20 | 93.5 | 8.2 | 97.0 | 0.072 |

Table 6 demonstrates that the collectors of this invention in pure form as shown in Examples 18–20 and 23–25 or in blended form as shown in Examples 21 and 22 exhibit stronger collector activity as compared to the standard xanthogen formate collector in blended or pure form at all of the dosages tested. Not only was the copper recovery of Examples 18–25 an average of about 3% higher with no loss in copper grade, but the recovery increase was obtained at a dosage much lower than that for the corresponding standard collectors. The dosage advantage for the hydrocarboxycarbonyl thionocarbamate collectors of this invention renders their use economically advantageous, e.g., better recovery with better grade at a cheaper reagents cost.

It should be mentioned that with this particular ore, the pyrite recoveries obtained were noticeably high and appeared to closely follow the copper recovery. A microscopic analysis disclosed that the pyrite in this particular ore at the grind employed was closely associated and/or rimmed with copper minerals, such that a high copper recovery with this ore inevitably produced high pyrite recovery. Even though high pyrite recoveries were observed for all of the collectors tested in Table 6, only the collectors of Examples 18–25 gave the highest $I_{cu}$ values for this ore at pH 4.0. Moreover, as shown in Example 22 of Table 6, a blend containing only 36% of the hydrocarboxycarbonyl thionocarbamate collector gave a higher copper recovery than was obtained with the standard collectors.

EXAMPLES 26–27

The following examples were conducted using the same South American ore that was used in Examples 15–25 to investigate the sensitivity of the collectors of this invention to pH and to test their efficacy under strongly acidic conditions. The flotation conditions and reagents used in Examples 18–25 were used in the following tests. Collector dosage was 5 g/T. Sulfuric acid was used to adjust pulp pH to the pH value indicated. The collectors were each tested at pH 2.75 and 3.70, and the results obtained are set forth in Table 7 as follows:

TABLE 7

| Example | Collector | pH | $H_2SO_4$ kg/T | Cu Rec. | CU Grade | $FeS_2$ Rec. |
|---|---|---|---|---|---|---|
| 26 | N—Ethoxycarbonyl-O—isobutyl thionocarbamate | 2.75 | 8.0 | 79.9 | 7.5 | 59.3 |
| 27 | N—Ethoxycarbonyl-O—isobutyl thionocarbamate | 3.70 | 5.2 | 80.1 | 8.4 | 81.0 |
| RR | Ethyl xanthogen ethyl formate (pure) | 2.75 | 8.0 | 24.5 | 2.6 | 11.8 |
| SS | Ethyl xanthogen ethyl formate (pure) | 3.70 | 5.2 | 19.1 | 2.5 | 8.5 |

The data of Table 7 clearly demonstrate that the collectors of the present invention outperform by a large margin the conventional neutral xanthogen formate collectors even under strongly acidic conditions, and that the hydrocarboxycarbonyl thionocarbamate collectors of this invention are generally not sensitive to pH. As shown in Table 7, under identical conditions, the standard collectors provided only 20–25% copper recovery, whereas the novel collector of this invention shown in Examples 26 and 27 provided about an 80% copper recovery. This result is probably due to the much greater hydrolytic stability of the present collectors over the standard collectors.

EXAMPLES 28–30

The same U.S. Southwestern ore having a 0.458% copper and 2.2% pyrite head assay that was used in Examples 2–14 was used in these flotations. The frother used was a 1:1 pine oil/MIBC mixture added at 50 g/T. Sulfuric acid was used to adjust the pH to the acid values indicated, and for a pH of 4.0, the sulfuric acid was added at about 1.7 kg/T.

The novel collectors were evaluated for collector strength and selectivity against a number of standard collectors under acid pH conditions using this particular ore. The collectors tested and the results obtained are set forth in Table 8 as follows:

TABLE 8

| pH 4.0, sulfuric acid 1.7 kg/T, Frother-1:1 pine oil/MIBC 50 g/T. Collector Dosage 0.01 Mole/T (approx. 2 g/T) unless otherwise mentioned | | | | | | | |
|---|---|---|---|---|---|---|---|
| Example | Collector | Dosage M/T | pH | % Cu Rec. | % Cu Grade | % $FeS_2$ Rec. | $I_{cu}$ |
| TT | Sodium diisobutyl dithiophosphate | 0.01 | 4.0 | 26.2 | 2.6 | 11.9 | 0.016 |
| UU | Sodium diisobutyl dithiophosphate | 0.03 | 4.0 | 53.1 | 4.5 | 34.5 | 0.030 |
| VV | Sodium diisobutyl dithiophosphate | 0.10 | 4.0 | 95.0 | 5.7 | 95.5 | 0.180 |
| WW | Sodium isobutyl xanthate | 0.01 | 4.0 | 20.0 | 1.9 | 10.6 | 0.014 |
| XX | Sodium isobutyl xanthate | 0.03 | 4.0 | 51.4 | 3.5 | 33.1 | 0.028 |
| YY | Sodium isobutyl xanthate | 0.10 | 4.0 | 94.9 | 5.1 | 99.5 | 0.020 |
| ZZ | Ethyl xanthogen ethyl formate (Batch 1) | 0.01 | 4.0 | 92.3 | 6.7 | 93.1 | 0.117 |
| AAA | Ethyl xanthogen ethyl formate (Batch 1) pH 3.7 | 0.01 | 3.7 | 65.2 | 5.6 | 70.1 | 0.025 |
| BBB | Ethyl xanthogen ethyl formate (Batch 2) | 0.01 | 4.0 | 91.0 | 6.0 | 96.4 | 0.045 |
| CCC | Ethyl xanthogen ethyl formate (Batch 2) pH 3.9 | 0.01 | 3.9 | 54.1 | 4.4 | 59.0 | 0.019 |
| DDD | Ethyl xanthogen ethyl formate (Batch 3), pure | 0.01 | 4.0 | 94.8 | 5.3 | 93.4 | 0.249 |
| 28 | N—Ethoxycarbonyl-O—isopropyl thionocar- | 0.01 | 4.0 | 96.3 | 6.4 | 91.5 | 0.621 |

TABLE 8-continued pH 4.0, sulfuric acid 1.7 kg/T, Frother-1:1 pine oil/MIBC 50 g/T. Collector Dosage 0.01 Mole/T (approx. 2 g/T) unless otherwise mentioned

| Example | Collector | Dosage M/T | pH | % Cu Rec. | % Cu Grade | % $FeS_2$ Rec. | $I_{cu}$ |
|---|---|---|---|---|---|---|---|
| | bamate | | | | | | |
| 29 | N—Ethoxycarbonyl-O—isopropyl thionocarbamate pH 3.90 | 0.01 | 3.9 | 94.9 | 5.8 | 92.3 | 0.299 |
| 30 | N—Ethoxycarbonyl-O—isobutyl thionocarbamate | 0.01 | 4.0 | 97.5 | 5.9 | 97.4 | 0.426 |

The results in Table 8 clearly demonstrate the superiority of the novel collectors of this invention (Examples 28–30) over the conventional collectors (examples TT–DDD) in terms of copper recovery, copper grade and selectivity index. It can be noted from Table 8 that with water-soluble, ionic collectors, dithiophosphate and xanthate, dosages that are 10 times more than that required for novel collectors had to be used to achieve the high copper recovery (approx. 95%) which is still lower than the recovery obtained with the novel collectors (97%). Even with the neutral collector, ethyl xanthogen ethyl formate, which is considered to be suitable for acid circuit applications, the copper recovery obtained is only in the range 91–95% (examples ZZ–DDD). Furthermore, the performance of this collector appears to be very sensitive to small fluctuations in pH; a slight decrease in pH from 4.0 to 3.9 or 3.7 drastically decreased copper recovery from 92.3 to 65.2% (compared Examples ZZ and AAA) and 91% to 54% (Examples BBB and CCC). Such is not the case with the novel collectors (compare Examples 28 and 29). This unusual stability with respect to pH provides a distinct advantage for the novel collectors over the conventional collectors, especially under actual plant conditions where pH fluctuations are inevitable.

EXAMPLES 31–32

It is generally believed that a neutral, oily collector is most effective when it is added to the grind instead of to the flotation cell. This statement generally holds true if the collector is highly water-insoluble and indispersible. The hydrocarboxycarbonyl thionocarbamate collectors of this invention, although water-insoluble for all practical purposes, were known to be easily dispersible. Testing was devised to evaluate whether the dispersability of these collectors provided additional advantages in their use. In this connection, two flotations were performed, one wherein 50% of the collector was added to the grind and the other 50% was added to the flotation cell during stage two flotation, and a second wherein 50% of collector was added to the cell at stage 1 flotation and the other 50% to the cell at stage 2 flotation. The same ore and collectors were used herein as in Examples 4–14. The flotations were run and the concentrates and tailings were assayed for copper. The results obtained are set forth in Table 9 as follows:

TABLE 9

| Example | Collector/Addition Method | Dosage M/T | Stage 1 % Cu Rec. | Stage 2 % Cu Rec. | Over all % Cu Rec. | Over all % Cu Grade |
|---|---|---|---|---|---|---|
| 31 | N—Ethoxycarbonyl-O—isobutyl thionocarbamate added 50% to grind + 50% to Stage 2 flotation. | 0.01 | 22.1 | 74.2 | 96.3 | 5.6 |
| 32 | N—Ethoxycarbonyl-O—isobutyl thionocarbamate added 50% to Stage 1 and 50% to Stage 2 flotation. | 0.01 | 84.6 | 12.9 | 97.5 | 5.9 |

The results of Table 9 indicate that unexpectedly improved results are obtained by adding the collectors of the present invention to the flotation cell rather than to the grind. A comparison of Examples 31 with 32 shows that when the collectors of this invention are added to the cell only, overall copper recovery is increased, e.g. 97.5% Cu recovery for Example 32 as opposed to 96.3% cu recovery for Example 31. One possible explanation for this difference may be that although the novel collectors of the present invention are selective for iron, some of the collecting power of the collector for copper may be lost in the grinding step due to adsorption of the collector to iron values in the steel ball milling/grinding apparatus.

It is interesting to note that the use of the novel collectors of this invention coupled with adding them to the flotation cell, instead of to the grind, provides an unexpected and rather dramatic improvement in the kinetics of flotation. More particularly, improved kinetics are demonstrated by better copper recoveries in the stage 1 flotation. As is readily understood by those skilled in this art, in a typical flotation process, the ore is floated to provide a rougher concentrate and tailings. The tailings are generally discarded and the rougher concentrate is reground, reconditioned and then subjected to cleaner flotation. This provides a cleaner concentrate and cleaner tailings. The cleaner concentrate is generally dried and delivered up for smelting or other further refining steps. The cleaner tails are then subjected to a scavenging flotation after reconditioning. Thereafter, the scavenging concentrate may be combined with the cleaner concentrate. The scavenged tailings may be combined with the main feed to the rougher flotation. In the reconditioning steps between the rougher, cleaner and scavenger flotation, the pH of the slurry is generally increased to provide better selectivity and copper recovery.

As shown by the data in Table 9, the novel collectors of this invention, when added to the cell, provided much higher and faster collector activity than when 50% of the collector was added to the grind. When the collector was added to the cell only, Example 32, about 84% of the copper floated in the stage 1 flotation in contrast to Example 31, wherein only 22.1% of the copper floated at stage 1. Improved kinetics of flotation yields a stage 1 rougher concentrate containing more copper and further indicates that reagent consumption may be reduced by judicious control of reagent feed and suggests that the number of cells in a flotation bank can be reduced. Throughput in the plant can also be increased.

EXAMPLES 33–34

The following flotation Examples were conducted at a pH of about 8.3 using the Southwestern U.S. copper-molybdenum ore having a 0.458% copper and 2.2% pyrite head assay. The frother used was a 50/50 pine oil/MIBC blend added at 50 gms/T. The collectors were added at 0.01 mole/T (approximately 2 gms/T). Lime was added in an amount of 1.76 kg/T to adjust the pulp pH to about 8.3. Conventional flotation practice with this ore has been to provide an operating pH of 11.2–11.3 which requires the addition of about 4.412 kg/T of lime. The collectors tested and the results obtained are set forth in Table 10 as follows:

TABLE 10 pH 8.3, Lime 1.76 kg/T
Frother 1:1 pine oil/MIBC 50 g/T,
Collector Dosage 0.01 M/T (approx. 2 g/T)

| Example | Collector | Cu Rec. | Cu Grade | $FeS_2$ Rec. | $I_{cu}$ |
|---|---|---|---|---|---|
| EEE | Ethyl xanthogen ethyl formate (Batch 3, pure) | 84.2 | 5.4 | 28.6 | 0.287 |
| FFF | Ethyl xanthogen ethyl formate (Batch 2) | 85.9 | 6.7 | 29.6 | 0.352 |
| 33 | N—Ethoxycarbonyl-O—isopropyl thionocarbamate | 90.6 | 9.3 | 38.9 | 0.688 |
| 34 | N—Ethoxycarbonyl-O—isobutyl thionocarbamate | 90.8 | 7.7 | 46.2 | 0.633 |

The results in Table 10 demonstrate the superiority of the hydrocarboxycarbonyl thionocarbamates of this invention over the conventional collector, ethyl xanthogen ethyl formate. Examples 33 and 34 provided about 5% higher copper recovery than was obtained with the conventional collector of Examples EEE and FFF, and the copper grades and $I_{cu}$ values were significantly higher also. These results were obtained at a 60% reduction in the lime consuption needed to process this ore, e.g. 1.76 kg/T for the present invention versus 4.412 kg/T for the conventional collectors.

EXAMPLES 35-36

Identical flotation tests were performed using the same ore, frother and collector dosage used in Examples 33–34 with the exception that a pH of 7.2 was used. To obtain this pH about 1.18 kg/T of lime were added which represents a 73% reduction in lime consumption over the standard 4.412 kg/T lime dosage required to provide pH of 11.2–11.3 utilized in prior art flotations for this ore. The collectors tested and the results obtained are set forth in Table 11, as follows:

TABLE 11 pH 7.2, Lime 1.18 kg/T,
Frother 1:1 Pine oil;MIBC 50 g/T,
Collector dosage 0.01 M/T (approx. 2 g/T)

| Example | Collector | Cu Rec. | Cu Grade | $FeS_2$ Rec. | $I_{cu}$ |
|---|---|---|---|---|---|
| GGG | Sodium diisobutyl dithiophosphate | 61.9 | 6.1 | 20.6 | 0.055 |
| HHH | Sodium isobutyl xanthate | 45.6 | 4.9 | 14.2 | 0.029 |
| III | Ethyl xanthogen ethyl formate (Batch 1) | 83.3 | 9.8 | 24.6 | 0.270 |
| JJJ | Ethyl xanthogen ethyl formate (Batch 2) | 86.0 | 7.7 | 30.8 | 0.351 |
| KKK | Ethyl xanthogen ethyl formate (Batch 3, pure) | 86.0 | 7.6 | 33.5 | 0.339 |
| 35 | N—Ethoxycarbonyl-O—isopropyl thionocarbamate | 90.9 | 7.4 | 47.6 | 0.632 |
| 36 | N—Ethoxycarbonyl-O—isobutyl thionocarbamate | 89.9 | 7.4 | 54.8 | 0.444 |

As demonstrated by the data of Table 11, even at a pH of 7.2, the new and improved hydrocarboxycarbonyl thionocarbamate collectors of this invention provided the best metallurgical performance compared to the conventional collectors, Examples GGG-KKK, in terms of better copper recovery which was 4–45% higher than obtained with the conventional collectors, better grade of concentrate and higher $I_{cu}$ values.

EXAMPLE 37

Identical flotation tests were performed using the same ore, frother and collector dosage as were used in Examples 33–36, with the exception that a pH of 10.0 was used. Lime was added at about 2.75 kg/T which represents a 38% reduction in lime consumption over the conventional 4.412 kg/T employed in the prior art processes. The results of testing at pH 10.0 are shown in Table 12 as follows:

TABLE 12 pH 10.0, Lime 2.75 Kg/T,
Frother - 1:1 pine oil/MIBC - 50 g/T,
Collector Dosage 0.01 M/T (approx. 2 g/T)

| Example | Collector | Cu Rec. | Cu Grade | $FeS_2$ Rec. | $I_{cu}$ |
|---|---|---|---|---|---|
| LLL | Ethyl xanthogen ethyl formate (pure, Batch 3) | 90.8 | 6.5 | 76.0 | 0.284 |
| MMM | Ethyl xanthogen ethyl formate (Batch 2) | 88.7 | 7.3 | 52.6 | 0.373 |
| 37 | N—Ethoxycarbonyl-O—isobutyl thionocarbamate | 89.7 | 8.2 | 31.8 | 0.640 |

The results of Table 12 indicate, that at a pH of 10.0, the hydrocarboxycarbonyl collector of Example 37 provided about 1% lower copper recovery than the conventional collector of Example, but exhibited a dramatically better selectivity against pyrite, e.g. only 32% pyrite recovery for Example 37 as compared with 76% for Example LLL, which is reflected in the higher $I_{cu}$ values.

EXAMPLES 38–43

In the following Examples, a Southwestern U.S. copper-molybdenum ore was used which had a head assay for copper of about 0.778% and for pyrite of about 5.7%. This ore was one of the most complicated of all of the ores tested in terms of complex mineralogy, low overall copper recovery, high lime consumption, and frothing problems. The ore contained predominantly chalcocite, however, the pyrite in the ore was excessively rimmed and disseminated with chalcocite and covellite. Pyrite separation in the rougher flotation was therefore not possible and was not attempted.

880 gms of the ore were conditioned with 500 gm/T of ammonium sulfide and ground for six minutes at 55.5% solids to obtain a pulp with the size distribution of 17.4% +65 mesh, 33% +100 mesh and 47.4% −200 mesh. The pulp was conditioned at 1500 rpm and 20.4% solids.

The standard operating pH for this ore is 11.4–11.5 using as a standard collector N-ethyl-O-isopropyl thionocarbamate. The lime consumption required to provide an operating pH of 11.4–11.5 is about 3.07 kg/T. The standard frother is cresylic acid added to about 150 gms/T.

The collectors were tested at the dosages and under the conditions indicated, and the results are set forth in Table 13, as follows:

TABLE 13

Head Assay Cu = 0.778%, $FeS_2$ = 5.7%, Frother - Cresylic Acid - 150 g/T, Collector Dosage and pH - see below

| Example | Collector | Dosage M/T | pH | Lime Kg/T | % Cu Rec. | % Cu Grade | % $FeS_2$ Rec. | $I_{cu}$ |
|---|---|---|---|---|---|---|---|---|
| NNN | N—ethyl O—isopropyl thionocarbamate | 0.105 | 8.0 | 0.23 | 74.3 | 10.3 | 62.2 | 0.057 |
| OOO | N—ethyl O—isopropyl thionocarbamate | 0.210 | 8.0 | 0.23 | 68.6 | 8.3 | 73.5 | 0.027 |
| PPP | N—ethyl O—isopropyl thionocarbamate | 0.105 | 9.0 | 0.74 | 78.2 | 9.7 | 62.0 | 0.080 |
| QQQ | N—ethyl O—isopropyl thionocarbamate | 0.210 | 9.0 | 0.85 | 79.1 | 8.9 | 71.5 | 0.065 |
| RRR | N—ethyl O—isopropyl thionocarbamate | 0.105 | 11.5 | 3.07 | 57.8 | 15.4 | 24.4 | 0.042 |
| SSS | N—ethyl O—isopropyl thionocarbamate | 0.210 | 11.5 | 3.07 | 81.0 | 11.6 | 54.8 | 0.126 |
| 38 | N—Ethoxycarbonyl-O—isopropyl thionocarbamate | 0.105 | 8.0 | 0.23 | 80.4 | 9.4 | 75.0 | 0.065 |
| 39 | N—Ethoxycarbonyl-O—isopropyl thionocarbamate | 0.210 | 8.0 | 0.23 | 81.5 | 7.8 | 92.5 | 0.022 |
| 40 | N—Ethoxycarbonyl-O—isopropyl thionocarbamate | 0.105 | 9.0 | 0.74 | 80.1 | 9.6 | 69.1 | 0.078 |
| 41 | N—Ethoxycarbonyl-O—isobutyl thionocarbamate | 0.105 | 8.0 | 0.23 | 78.8 | 8.3 | 85.6 | 0.032 |
| 42 | N—Ethoxycarbonyl-O—isobutyl thionocarbamate | 0.210 | 8.0 | 0.23 | 82.4 | 7.8 | 94.5 | 0.018 |
| 43 | N—Ethoxycarbonyl-O—isobutyl thionocarbamate | 0.105 | 9.0 | 0.70 | 82.6 | 8.8 | 79.6 | 0.067 |

It is evident from the results in Table 13 that the novel collectors of this invention (Examples 38–40 and 42–32) returned superior metallurgy at pH 8.0 and 9.0 compared with the stndard collector (Examples NNN-SSS) at pH 11.5. By using the novel collectors at pH 8.0 or 9.0, acceptable metallurgy can be achieved at dramatically reduced lime consumption (7.5% of the total lime consumption to give pH 8.0 and 25% of the total to give pH 9.0) ad reduced collector dosage (0.105 M/T instead of 0.210 M/T required for standard collector at pH 11.5).

EXAMPLES 44–47

A South American Cu-Mo ore which contained 1.844% Cu and 4.2% pyrite was used in the following tests. The copper minerals were predominantly chalcocite, chacopyrite, covellite and bornite.

510 g of the ore was wet ground for 7.5 min. at 68% solids to obtain a pulp with the size distribution of 24.7% +65M, 38.3% +100M and 44% −200M. 2.5 g/T of di-sec butyl dithiophosphate was added to the grind in all of the tests. Lime was also added to the grind to obtain the required pH in flotation. The pulp was transferred to the flotation cell and conditioned at 1100 rpm ad 32% solids.

This ore was used for further flotation tests in mildly alkaline circuits with the novel collectors of this invention. The standard collector scheme is composed of about 30–40 g/T of sodium isopropyl xanthate and 2.5 g/T of di(sec-butyl) dithiophosphate and the standard flotation pH is 10.5. The lime consumption at this pH is about 0.53 Kg/T. The standard frother is 1:1:1 polypropylene glycol monomethylether/MIBC/pine oil at 20–25 g/T. The collectors tested and the results obtained are set forth in Table 14 as follows:

TABLE 14

Head Cu = 1.85%, $FeS_2$ = 4.2%, Frother - 1:1:1 Dow 250/MIBC/pine oil - 25.5 g/T, Collector dosage and pH - see below

| Example | Collector | Dosage M/T | pH | Lime Kg/T | % Cu Rec. | % Cu Grade | % $FeS_2$ Rec. | $I_{cu}$ |
|---|---|---|---|---|---|---|---|---|
| TTT | Sodium isopropyl xanthate | 0.19 | 8.0 | 0.11 | 60.0 | 16.0 | 62.0 | |
| UUU | " | 0.19 | 9.0 | 0.29 | 79.3 | 16.0 | 83.1 | 0.04 |
| VVV | " | 0.19 | 10.5 | 0.53 | 85.5 | 15.6 | 88.1 | 0.057 |
| XXX | " | 0.125 | 10.5 | 0.53 | 84.4 | 11.8 | 86.2 | 0.057 |
| 44 | N—Ethoxycarbonyl-O—isopropyl thionocarbamate | 0.125 | 9.0 | 0.25 | 84.2 | 14.5 | 78.0 | 0.088 |
| 45 | N—Ethoxycarbonyl-O—isobutyl thionocarbamate | 0.0625 | 8.0 | 0.12 | 86.3 | 17.3 | 55.1 | 0.241 |
| 46 | N—Ethoxycarbonyl-O—isobutyl thionocarbamate | 0.125 | 8.0 | 0.12 | 84.5 | 16.6 | 55.2 | 0.187 |

TABLE 14-continued

Head Cu = 1.85%, $FeS_2$ = 4.2%,
Frother - 1:1:1 Dow 250/MIBC/pine oil - 25.5 g/T,
Collector dosage and pH - see below

| Example | Collector | Dosage M/T | pH | Lime Kg/T | % Cu Rec. | % Cu Grade | % $FeS_2$ Rec. | $I_{cu}$ |
|---|---|---|---|---|---|---|---|---|
| 47 | N—Ethoxycarbonyl-O—isobutyl thionocarbamate | 0.125 | 9.0 | 0.24 | 89.9 | 14.4 | 88.9 | 0.109 |

The results given in Table 14 demonstrate that the novel collectors of this invention show an excellent performance, both in terms of copper recovery (with no loss in Cu grade) and pyrite rejection at a reduced lime consumption and reduced collector dosage. Most importantly, the standard collector gave an unacceptably low copper recovery at pH 8.0 even with an increased collector dosage.

EXAMPLE 48

In the earlier examples, it has been demonstrated that the new and improved hydrocarboxycarbonyl thionocarbamate collectors of the present invention exhibit superior performance at reduced or no lime consumption and at reduced dosages of collector as compared with a large number of conventional collectors on a variety of ores in the rougher or first stage flotation. In actual practice, the rougher concentrate is cleaned in one or more stages to obtain a high grade copper minerals or copper-molybdenum minerals concentrate for further treatment for metal production.

The following examples illustrate the use of the new and improved hydrocarboxycarbonyl thinonocarbamate collectors in cleaner flotation systems to provide higher copper grade concentrates for use in smelters or the like.

In the following examples, the same ore was used as that for Examples 44–47. The first stage or rougher flotation was performed in accordance with the methods of Examples 1–47. The concentrate was filtered and dried and then reground to form a pulp of approximately 40% solids. The pH of the regrind was adjusted with lime and more collector and frother were added as needed. The reground pulp was conditioned and refloated as before with the rougher concentrate to provide cleaner concentrate and cleaner tails. The cleaner tails were scavenged at gradually higher pH values, with or without further addition of collector and frother, and finally scavenged at a pH of greater than 11.0 with additional collector to float any remaining copper minerals, and each stage product was separately analyzed.

The following Table 15 shows the results obtained by subjecting the ore to a rougher stage flotation and a second stage or cleaner flotation, using a standard sodium isopropyl xanthate collector at pH 11.0 for comparison. Additional collector was added in Example 48, in the stage 2 cleaner flotation, because it appeared that the amount added in the rougher flotation was not enough to carry over into the cleaner flotation. The standard collector carried over and was present in sufficient quantities in the second stage flotation, so that no additional collector was added in the second stage control.

The results obtained are set forth in Table 15, as follows:

TABLE 15

CLEANER FLOTATIONS
Cu Head Assay = 1.85%, $FeS_2$ = 4.2%,
Frother - 1:1:1 Dow 250/MIBC/Pine Oil

| EXAMPLE | FFFF | 48 |
|---|---|---|
| Collector | Sodium isopropyl xanthate | N—Ethoxycarbonyl-O—Isobutyl thionocarbamate |
| A. FIRST STAGE Rougher Flotation | | |
| Collector dosage, g/T | 30.0 | 12.8 |
| pH | 10.5 | 8.2 |
| lime used, Kg/T | 0.608 | 0.108 |
| Recovery, % | | |
| Cu | 86.9 | 88.1 |
| $FeS_2$ | 90.9 | 63.7 |
| Mo | 64.0 | 55.6 |
| Grade, % | | |
| Cu | 18.30 | 21.30 |
| Fe | 20.70 | 16.40 |
| B. SECOND STAGE Cleaner Flotation | | |
| Collector dosage, g/T | — | 4.2 |
| pH | 11–11.6 | 8.7–9.6 |
| Lime used, Kg/T | 0.343 | 0.118 |
| Grade of Cleaner Conc., % | | |
| Cu | 39.4 | 41.9 |
| Fe | 22.2 | 18.6 |
| Mo | 0.56 | 0.58 |
| TOTAL COLLECTOR ADDED, g/T | 30.0 | 17.0 |
| TOTAL LIME ADDED, kg/T | 0.951 | 0.226 |
| TOTAL FROTHER ADDED, g/T | 38.0 | 39.0 |

The results of Table 15 clearly demonstrate the excellent performance of the new and improved hydrocarboxycarbonyl thionocarbamate collectors of this invention in both rougher and cleaner flotation as compared with the standard collector control. More particularly, the grade of the copper cleaner concentrate was about 2.5 percentage points higher for Example 48 than for the control (41.9%) and the grade of copper in the rougher concentrate for Example 48 was similarly three percentage points higher than that of the control. The total collector dosage to achieve this grade of copper was only 17 g/T for Example 48 vs. 30 g/T for the control. Example 48 shows that better copper recovery and grade are obtained using the collectors of this invention at a collector cost savings of about 45%. Example 48 shows that good recovery and good grade are obtained in a cleaner flotation circuit with the collectors of this invention using less lime, e.g. 0.226 kg/T vs. 0.951 kg/T for the control. This represents a savings in lime consumption costs of over 75%. The cleaner concentrate of Example 48 had almost 4 percentage points lower iron that did the standard collector, e.g. 18.6% vs. 22.2%, which indicates superior selectivity against pyrite for the collectors of this invention over the control. The superior selectivity of the collectors of this invention is also evident from the low pyrite recovery in the rougher flotation, e.g., 63.7% as compared with the standard collector, e.g., 90%. Moreover, the copper recovery in the rougher flotation provided by the collector of this invention in Example 48 was higher than that obtained with the standard collector using less than half the dosage of the standard collector in the rougher flotation.

EXAMPLE 49

Bulk Sulfide Flotation

An Eastern/Southern U.S. copper-zinc-pyrite-pyrrhotite ore was used in the following flotation tests. It contained about 0.5–0.7% copper as chalocopyrite, 0.9% zinc and 30–35% iron as pyrrhotite and pyrite. The ore also contained a large amount of carbonate gangue minerals, such as calcite, dolomite, etc., in addition to the usual silicate or siliceous type gangue.

The ball mill discharge from an operating plant was used for all of the tests. The pulp contained ore particles of about 40% −200 mesh. About 4 liters of pulp were modified with 1–10 lbs/ton of concentrated sulfuric acid at 25% solids for 30 secs at 1800 rpm. The collector and frother were then added and the pulp was conditioned for 2 minutes. Flotation was carried out for 4 minutes with natural air flow rate at 1800 rpm agitation and a first stage concentrate was collected. The pulp was then conditioned for 30 seconds with additional frother and a second stage flotation concentrate was collected for 4 minutes. The first stage and second stage concentrates and the tails were filtered, dried and assayed for copper, iron, sulfur and zinc.

The results are given in Table 16, below. The conventional collector was sodium ethyl xanthate and the frother was a polypropylene glycol (OP 515 of Oreprep Inc.).

TABLE 16

BULK SULFIDE FLOTATION
Head assay: Cu = 0.677, Zn = 1.00, Fe = 33.2, S = 19.24
Frother = 35 g/T

| Example | Collector | Collector Dosage g/T | $H_2SO_4$ Dosage kg/T | Recovery, % Cu | Fe | Zn | S | Grade, % Cu | Fe | Zn | S |
|---|---|---|---|---|---|---|---|---|---|---|---|
| GGGG | Sodium Ethyl Xanthate | 107.6 | 4.88 | 96.5 | 90.6 | 56.1 | 97.5 | 1.22 | 53.0 | 1.10 | 34.5 |
| HHHH | Sodium Ethyl Xanthate | 101.2 | 4.59 | 94.3 | 87.4 | 52.4 | 96.2 | 1.25 | 54.2 | 1.10 | 35.7 |
| IIII | Sodium Ethyl Xanthate | 70.0 | 4.24 | 92.0 | 88.1 | 43.3 | 96.1 | 1.15 | 54.4 | 0.70 | 35.7 |
| 49 | N—Ethoxycarbonyl-O—isobutyl thionocarbamate | 77.0 | 1.87 | 95.0 | 92.2 | 55.1 | 98.3 | 1.08 | 54.6 | 1.00 | 35.5 |

The results in Table 16 demonstrate that the hydrocarboxycarbonyl thionocarbamate collectors of this invention in Example 49 provide essentially equivalent metallurgy in bulk sulfide flotation at about 25% lower dosage and about 62% lower sulfuric acid consumption, as compared with the conventional collector of Examples GGGG–IIII.

The foregoing examples demonstrate the significant improvements and advantages achieved with the new and improved hydrocarboxycarbonyl thionocarbamate collectors of this invention over a number of conventional collectors known to those skilled in this art.

Although the present process has been described with reference to certain preferred embodiments, modifications or changes may be made therein by those skilled in this art. For example, instead of N-ethoxycarbonyl-O-alkyl thionocarbamates and N-phenoxycarbonyl-O-alkyl thionocarbamates, other hydrocarboxycarbonyl thionocarbamates of the above formula may be used as the sulfide collector herein, such as N-cyclohexoxycarbonyl-O-alkyl thionocarbamates, N-(3-butene)1-oxycarbonyl-O-alkyl thionocarbamates, N-alkoxycarbonyl-O-arylthionocarbamates and N-aryloxycarbonyl-O-aryl thionocarbamates to name but a few. Moreover, as has been mentioned above, the process may be practiced using as the collector component mixtures of two or more of the hydrocarboxycarbonyl thionocarbamates, as well as mixtures of at least one hydrocarboxycarbonyl thionocarbamate collector in combination with another known collector which may be selected from, for example (a) xanthates or xanthate esters, e.g.

$$R^8O-\overset{S}{\overset{\|}{C}}-S^-M^+, \text{ or } R^8O-\overset{S}{\overset{\|}{C}}-SR^9,$$

respectively;

(b) dithiophosphates $$(R^8O)-\overset{S}{\overset{\|}{P}}-S^-M^+;$$

(c) thionocarbamates, e.g.

$$R^8O-\overset{S}{\overset{\|}{C}}-NHR^9;$$

(d) dithiophosphinates, e.g.

$$(R^8)_2\overset{S}{\overset{\|}{P}}-S^-M^+;$$

(e) dithiocarbamates and derivatives thereof, e.g.

$$R^8\overset{R^{11}}{\overset{|}{N}}-\overset{S}{\overset{\|}{C}}-S^-M^+ \text{ or } R^8\overset{R^{11}}{\overset{|}{N}}-\overset{S}{\overset{\|}{C}}-S-R^9,$$

respectively;

(f) trithiocarbonates and derivatives thereof, e.g., $$R^8S-\overset{S}{\overset{\|}{C}}-S^-M^+ \text{ or } R^8S-\overset{S}{\overset{\|}{C}}-S-R^9,$$

respectively; and (g) mercaptans, e.g., $$R^{10}SH;$$

wherein in each of (a)–(e) above $R^8$ is $C_1$–$C_6$ alkyl and $R^9$ is $C_1$–$C_6$ alkyl, aryl or benzyl, and $R^{11}$ is hydroxy or $R^8$ and in (f) $R^{10}$ is $C_1$–$C_{12}$ alkyl.

In place of copper mineral values, the process of the present invention may be used to beneficiate other sulfide mineral and metal values from sulfide ores, including, for example, lead, zinc, nickel, cobalt, molybdenum, iron, as well as precious metals such as gold, silver, platinum, palladium, rhodium, irridium, ruthenium, and osmium. All such obvious modifications or changes may be made herein by those skilled in this art, without departing from the scope or spirit of the present invention as defined by the appended claims.

What is claimed is:

1. A collector composition for froth flotation of sulfide minerals comprising at least one hydrocarboxycarbonyl thionocarbamate selected from the group consisting of:

N-ethoxycarbonyl-O-n-butyl thionocarbamate;
N-ethoxycarbonyl-O-isobutyl thionocarbamate;
N-ethoxycarbonyl-O-sec. butyl thionocarbamate;
N-ethoxycarbonyl-O-n-amyl thionocarbamate;
N-ethoxycarbonyl-O-isoamyl thionocarbamate;
N-ethoxycarbonyl-O-phenyl thionocarbamate;
N-phenoxycarbonyl-O-ethyl thionocarbamate;
N-phenoxycarbonyl-O-isopropyl thionocarbamate;
N-phenoxycarbonyl-O-n-butyl thionocarbamate;
N-phenoxycarbonyl-O-isobutyl thionocarbamate;
N-phenoxycarbonyl-O-sec. butyl thionocarbamate;
N-phenoxycarbonyl-O-n-amyl thionocarbamate and
N-phenoxycarbonyl-O-isoamyl thionocarbamate.

2. A collector composition as defined in claim 1 wherein the thionocarbamate is N-ethoxycarbonyl-O-n-butyl thionocarbamate.

3. A collector composition is defined in claim 1 wherein the thionocarbamate is N-ethoxycarbonyl-O-isobutyl thionocarbamate.

4. A collector composition as defined in claim 1 wherein the thionocarbamate is N-ethoxycarbonyl-O-sec. butyl thionocarbamate.

5. A collector composition as defined in claim 1 wherein the thionocarbamate is N-ethoxycarbonyl-O-n-amyl thionocarbamate.

6. A collector composition as defined in claim 1 wherein the thionocarbamate is N-ethoxycarbonyl-O-isoamyl thionocarbamate.

7. A collector composition as defined in claim 1 wherein the thionocarbamate is N-ethoxycarbonyl-O-phenyl thionocarbamate.

8. A collector composition as defined in claim 1 wherein the thionocarbamate is N-phenoxycarbonyl-O-ethyl thionocarbamate.

9. A collector composition as defined in claim 1 wherein the thionocarbamate is N-phenoxycarbonyl-O-isopropyl thionocarbamate.

10. A collector composition as defined in claim 1 wherein the thionocarbamate is N-phenoxycarbonyl-O-n-butyl thionocarbamate.

11. A collector composition as defined in claim 1 wherein the thionocarbamate is N-phenoxycarbonyl-O-isobutyl thionocarbamate.

12. A collector composition as defined in claim 1 wherein the thionocarbamate is N-phenoxycarbonyl-O-sec. butyl thionocarbamate.

13. A collector composition as defined in claim 1 wherein the thionocarbamate is N-phenoxycarbonyl-O-n-amyl thionocarbamate.

14. A collector composition as defined in claim 1 wherein the thionocarbamate is N-phenoxycarbonyl-O-isoamyl thionocarbamate.

* * * * *